April 12, 1960

A. R. AINSWORTH ET AL 2,932,725

ELECTRIC ARC STUD WELDING

Filed Aug. 13, 1958

INVENTORS
ARTHUR RATCLIFFE AINSWORTH
DONALD JOHN TAYLOR
DONALD JAMES NEVILLE LAURIE

*Pyle & Fisher*

ATTORNEYS

April 12, 1960     A. R. AINSWORTH ET AL     2,932,725
ELECTRIC ARC STUD WELDING Filed Aug. 13, 1958     3 Sheets-Sheet 3

INVENTORS
ARTHUR RATCLIFFE AINSWORTH
DONALD JOHN TAYLOR
DONALD JAMES NEVILLE LAURIE

Pyle & Fisher
ATTORNEYS

United States Patent Office 2,932,725
Patented Apr. 12, 1960

2,932,725

ELECTRIC ARC STUD WELDING

Arthur Ratcliffe Ainsworth, Tadworth, Donald John Taylor, Clapton, London, and Donald James Neville Laurie, Marlow, England, assignors to Crompton Parkinson Limited, Guiseley, England, a corporation of Great Britain Application August 13, 1958, Serial No. 754,897

4 Claims. (Cl. 219—98)

This invention relates to a new method and apparatus for stud welding.

In the electric arc welding of a stud to a metal plate or other workpiece there is a rapid sequence of steps which requires accurate control and consequently stud welding equipment normally includes a relatively elaborate system of timing the control. In order to initiate the arc the stud is first withdrawn from the workpiece by means of a solenoid and it is desirable that before the main welding current is supplied to the arc, a small pilot arc should be drawn. For this purpose, the current flowing is limited by a series impedance which is subsequently short circuited by a main contactor to apply the full welding current. This main current is supplied for a time depending on the nature of the metal and the size of stud and then the solenoid is de-energised to return the stud to the plate and the welding current is cut off. Each of the steps in this sequence normally requires individual control.

According to the present invention, the main contactor which short circuits the series impedance to apply the full welding current, is energised either directly or indirectly by the voltage set up between the stud and the workpiece when the pilot arc is struck. Thus, as soon as the pilot arc has been struck, the contactor is automatically closed to supply the main welding current and after an interval determined in the usual way, the solenoid is de-energised to return the stud to the workpiece. This automatically interrupts the supply of welding current since the main contactor is de-energised by the collapse of the voltage between the stud and the workpiece. Thus, the only stage of the operation which requires individual timing is the interval during which the main arc is burning and this may be determined quite simply; for example, by means of a pneumatic timer or a capacity-resistance timer.

The step which starts the sequence of operations for carrying out a weld is the energisation of the solenoid for retracting the stud from the workpiece to strike the pilot arc. Once this has been done, the remainder of the sequence follows automatically and it is therefore important that the solenoid should not be capable of energisation unless the stud is in contact with the workpiece. For this reason the circuit to the solenoid preferably includes the contacts of a relay, the coil of which is connected in series with a control switch and with the stud and the workpiece. Consequently, if the control switch is closed without the stud in contact with the workpiece, the relay is not energised and the circuit to the solenoid is not completed. In the absence of such an arrangement, it might be possible for the solenoid to be energised without the stud being in contact with the workpiece and this would then be followed by the energisation of the main contactor. The solenoid would be de-energised after the normal time interval but since this would not result in returning the stud to the workpiece the voltage energising the main contactor would persist and there would be the danger of the main contactor remaining energised for long periods without the knowledge of the operator.

Most simply, the coil of the main contactor is connected between the stud and the workpiece so that it is energised directly by the voltage established by the drawing of the pilot arc. If, however, a relay is provided, as just described, with its coil connected in series with the stud and the work piece so as to prevent operation when the stud and workpiece are separated, the presence of the main contactor coil connected between these two components will provide an alternative circuit for energising the relay under all conditions. Under these circumstances therefore, the relay may be provided with a second pair of normally open contacts connected in the circuit which includes the coil of the main contactor and the stud and workpiece. Thus the coil of the main contactor is only connected between the stud and workpiece when the relay has been operated and thus does not constitute a bypass circuit for the operation of the relay.

As an alternative to connecting the coil of the main connector directly between the stud and the workpiece, the main contactor may be energised indirectly by means of a relay which is itself connected between the stud and the workpiece and the contacts of which are included in the circuit to the coil of the main contactor. Consequently, the striking of the pilot arc operates the relay which, in its turn, energises the main contactor.

An arrangement in accordance with the invention may conveniently be applied to equipment including a welding tool having one solenoid connected in series with the arc to retract the stud from the plate and the other connected in parallel with the arc which is energised as soon as the pilot arc is established so as to hold the stud retracted during the period of the main arc. Such a form of tool is well known in the art. With such an arrangement, the series solenoid acts as the current-limiting impedance which is short circuited by the main contactor after the retraction of the stud, while the other solenoid has its circuit completed by the closing of the main contactor and interrupted after the predetermined time interval.

From the foregoing discussion, the objects of the invention will be generally understood.

Other objects and a fuller understanding of the invention may be had by referring to the following description and claims, taken in conjunction with the accompanying drawings, in which:

Figure 1:
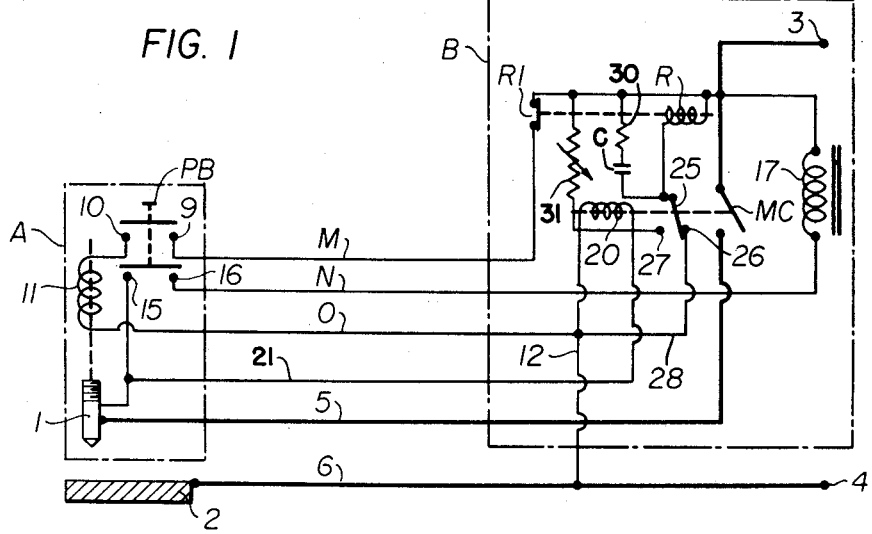
Figure 1 is a circuit diagram showing a simple arrangement using a capacity-resistance timer.

Turning first to the arrangement of Figure 1, the part of the circuit shown enclosed within dotted lines at A is included in the welding tool, while that enclosed in the dotted line at B forms part of the controller, the two being connected together by a multi-core cable. The tool includes a chuck for a stud 1 which is to be welded to a workpiece in the form of a metal plate 2. Direct current is supplied to terminals 3 and 4 forming part of the controller and is supplied to the stud and the plate respectively by way of heavy conductors 5 and 6 respectively.

The welding tool includes a push button PB by means of which the welding operation is initiated. The push button includes two pairs of contacts of which one pair 9 and 10 are included in a circuit which passes from the terminal 3 via the normally closed contacts R1 of a relay R and thence via the contacts 9 and 10 to a solenoid 11 for retracting the stud 1, and from there by way of an earth connection 12 to the terminal 4.

The second pair of contacts 15 and 16 of the push button are connected in a circuit which passes from the terminal 3 by way of a current-limiting impedance in the form of a choke 17 and thence via the contacts 16 and 15 to the stud 1. When the stud is in contact with the plate 2 the circuit is then completed via the conductor 6 back to the terminal 4. Consequently, when the push button is operated, the solenoid 11 is energised to retract the stud. If the stud 1 is in contact with the plate when thus retracted, a pilot arc will be struck: The magnitude of which is limited by the presence of the choke 17. In practice the pilot arc may carry a current of the order of 10 to 15 amperes, while the main welding current may be of the order of several hundreds of amperes.

As soon as the pilot arc is struck a voltage is established between the stud 1 and plate 2 and this is used to energise a coil 20 of a main contactor MC which is connected in the conductor 5 between the terminal 3 and the stud 1. For this purpose the coil 20 is connected to the conductor 6 by way of the connection 12 and is connected to the stud 1 by means of a conductor 21. Consequently, the striking of the pilot arc energizes the main contactor MC to establish the main welding current between the stud 1 and the plate 2.

The operation of the main contactor starts an automatic timer which, as shown, is of the capacity-resistance type. This is brought about by operation of a contact-making arm 25 which opens a contact 26 and closes a contact 27. When in engagement with the contact 26, as shown in the drawing, this arm completes a circuit by way of a conductor 28 and the connection 12 to the coil of the relay R which is thus normally energised to close its contacts R1.

A charging circuit is also completed to a condenser C connected in series with a resistance 30. When the arm 25 is moved over to the contact 27, however, both these circuits are interrupted. The relay R remains, however, temporarily in the operated position owing to the discharge current of the condenser C which discharges through parallel paths passing through the coil of the relay R and a variable resistance 31. As soon as the condenser C is discharged the relay R is de-energised and opens its contacts R1. The time interval between the closing of the main contactor and the opening of the contacts RL may be controlled by means of variation of the resistance 31 and it is this period which determines the duration of the main arc.

As soon as the contacts R1 open the solenoid 11 is de-energised and the stud 10 allowed to return to the plate 2. This brings about the collapse of the voltage energising the coil 20 of the main contactor MC and consequently the latter is de-energised to interrupt the main welding current and thus bring about the completion of the weld. It will be understood that the only part of the operation which requires positive timing is the duration of the main arc, since the opening and closing of the main contactor follow automatically from the establishment and collapse of the arc voltage.

Although the circuit just described is entirely practicable and efficient it is not completely foolproof since it is quite possible to operate the push button PB when the stud 1 is not in contact with the plate 2. If this is done, the solenoid 11 is energised, as previously described and a voltage will then exist between the stud and the plate which will energise the main contactor. The solenoid 11 will be de-energised after the normal interval but since this will not serve to move the stud into contact with the plate, the voltage energising the main contactor will persist and it is possible for this contactor to remain energised for long periods without the operator noticing. It will be appreciated that in the majority of cases, the welding tool is separated from the controller by a relatively long length of cable and that since the controller in general will be enclosed, the operator will have no means of knowing whether or not the main contactor is energised.

Figure 2:
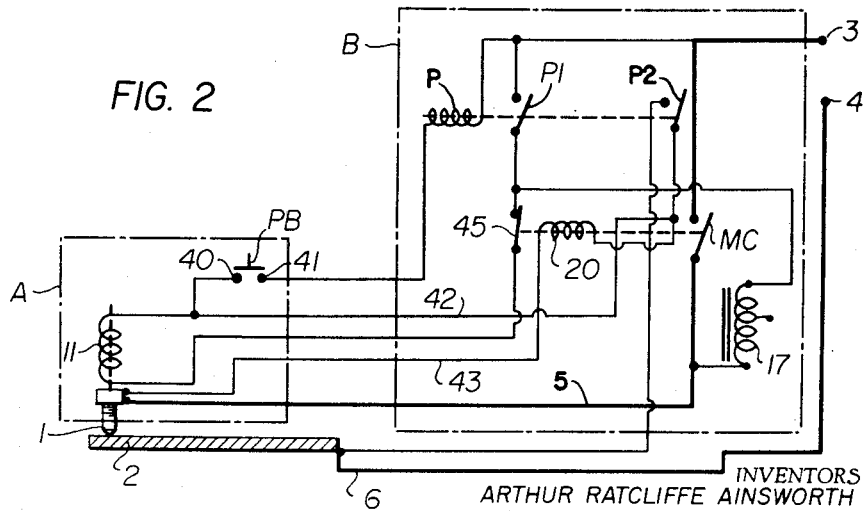
Figure 2 is a circuit diagram of a modification of Figure 1, using a pneumatic timer.

The circuit arrangement of Figure 2 is devised to overcome this slight disadvantage. Again the components of the circuit included in the tool are shown as A, while those included in the controller are shown as B. Other corresponding components are identified by the same reference numerals as in Figure 1 and it will be seen that once again the current in the pilot arc is limited by the presence of the choke 17 which in this case is shown as provided with a tapping in order to render it adjustable.

In this case, the push button PB has only a single pair of contacts 40 and 41 which are connected in the circuit of a relay P having normally open contacts P1 and P2. The circuit to the coil of the relay P after passing through the contacts 40 and 41 passes via a conductor 42 to the coil 20 of the main contactor MC and thence via a conductor 43 to the stud 1. Consequently, the circuit to the relay P is only completed if the stud is in contact with the plate. Under these conditions operation of the push button energises the relay P to close its contacts P1 and P2. Both these contacts are connected in the circuit to the solenoid 11, this circuit passing through the contact P1, through a normally closed contact 45, through the solenoid 11 and then via the conductor 42 and the contact P2 to the plate 2. The solenoid 11 is thus energised to retract the stud from the plate to draw the pilot arc, the circuit to which passes through the contact P1 and thence via the choke 17 as in the previous circuit.

The establishment of the arc voltage energises the coil 20 which is connected directly between the stud and the plate, as in the previous circuit. The circuit of the coil 20 includes the contact P2 and the reason for this contact is that in its absence the coil 20 would provide an alternative circuit for energising the relay P even when the stud 1 is not in contact with the plate 2. With the circuit shown, however, the fact that the stud is separated from the plate positively prevents operation of the relay P and accidental operation of the push button PB produces no ill effects.

The timer shown in this circuit is pneumatically operated and the contact 45 is opened a predetermined time after the closing of the main contactor MC. This time delay is achieved by means of a dashpot arrangement which is not illustrated. Such a form of pneumatic timing is a standard alternative to the capacity-resistance timing shown in Figure 1 and the two forms of timer are interchangeable.

Figure 3:
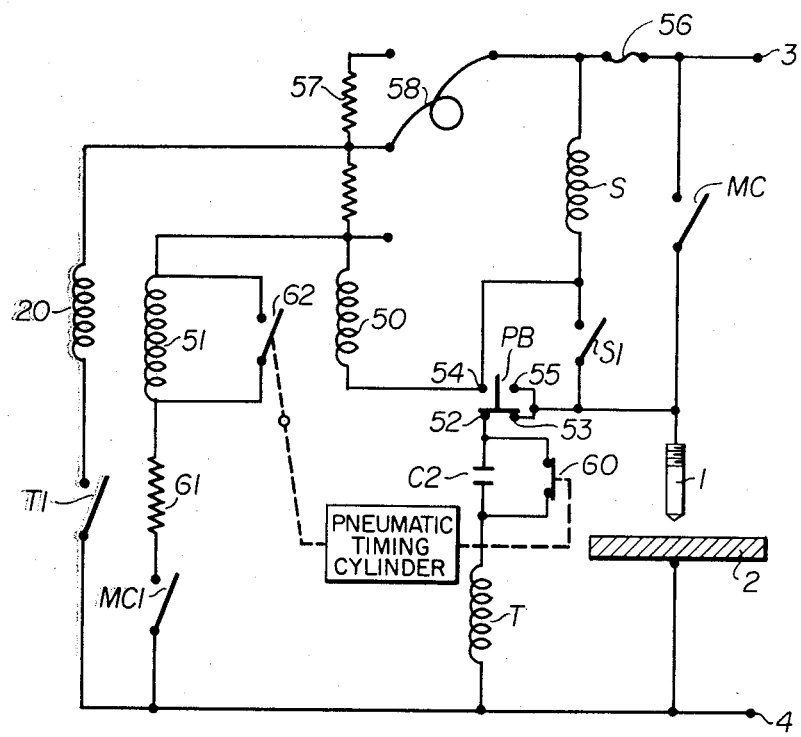
Figure 3 is a circuit diagram of an arrangement including two solenoid coils; and, Figure 4 is a view partly in section illustrating a stud welding tool and the circuit of Figure 1 to operate it.
Figure 4:
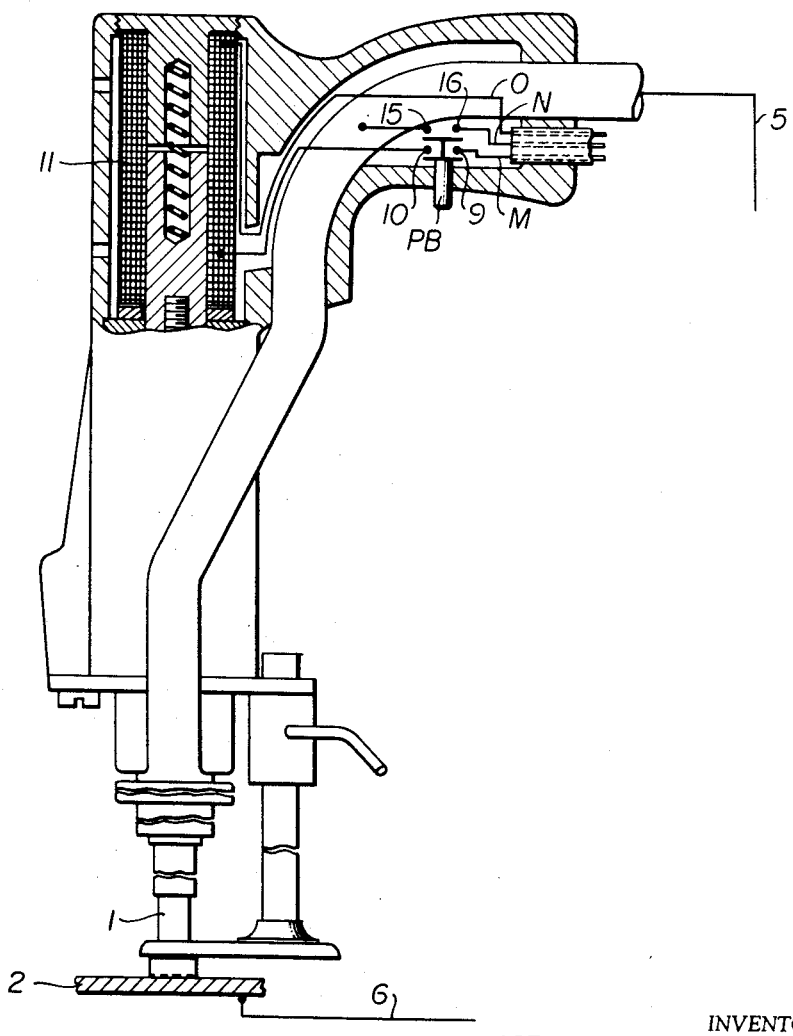

The circuit diagram shown in Figure 3 includes a pair of solenoid coils for controlling the movement of the stud 1, as described in, and well known in, the art. A coil 50 is connected in series with the pilot arc to bring about the retraction of the stud 1, while a coil 51 is connected in parallel with the arc to maintain the stud retracted during the passage of the full welding current. The operation is controlled by means of a push button PB which has two pairs of changeover contacts 52, 53, and 54, 55. Normally the contacts 52, 53 are connected together but operation of the push button connects together the contacts 54, 55. This completes a circuit from the terminal 3 through a fuse 56, a resistance 57 having a variable tap 58, the series solenoid coil 50, the contacts 54 and 55 to the stud 1 and thence to the plate 2 and the terminal 4. It also completes a parallel circuit to a relay S having a normally open contact S1 which closes to by-pass the contacts 54 and 55.

The solenoid coil 50, together with the variable resistance 57 acts as the current-limiting impedance controlling the pilot arc current and the passage of this current through the coil 50 retracts the stud 1. As long as the push button PB remains operated no further action occurs. As soon as the push button is released, however, the contacts 52 and 53 are connected together and the arc voltage is able to energise the coil 20 of the main contactor MC. This is achieved indirectly by first operating a relay T which is connected between the stud 1 and the plate 2 by way of a normally closed contact 60 connected in parallel with a condenser C2. The operation of the relay T closes its normally open contact T1 to energise the coil 20 and close the main contactor MC to supply full welding current. The closing of the main contactor short circuits the current-limiting impedance which in this circuit is constituted by the series solenoid coil 50. Simultaneously therefore the shunt coil 51 is energised in order to maintain the stud 1 retracted from the plate 2. This is achieved by means of an auxiliary contact MC1 on the main contactor MC which is connected in series with a resistance 61 and the coil 51. The closing of the main contactor MC also starts a timer which, in this case, is shown as being pneumatically operated. This timer controls two pairs of contacts, the normally closed contacts 60 and normally open contacts 62, which short circuit the coil 51. At the end of the time interval therefore the contacts 62 close, short circuiting the coil 51 and allowing the stud to return to the plate. This causes the collapse of the arc voltage, de-energising the relay T and causing the main contactor to open to interrupt the welding current.

At the same time as the contact 62 closes, the contact 60 opens. This contact is provided to ensure against the possibility of the stud becoming stuck in the retracted position. If this were to occur the main contactor MC would remain closed, even though the coil 51 were short circuited. The opening of the contact 60 interrupts the direct circuit to the relay T and by removing the short circuit across the condenser C2 allows the latter to begin charging. The charging current flowing to the condenser C2 keeps the relay T operated for a short space of time and if at the end of that time the stud has not returned to the plate for any reason, the relay T is de-energized to open the main contactor MC, even though the arc voltage is still in existence.

The circuit just described includes all the advantages of the double solenoid arrangement and also includes the advantage of the circuit of Figure 2 in that no operation can occur unless the stud is in contact with the plate. The provision of the relay T which causes the main contactor to be energized indirectly rather than directly enables the additional safety precaution to be included whereby the welding current is cut off, even though the arc voltage may still be in existence, as just described.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a drawn arc welding apparatus having mechanical provisions for placing two members into contact in the approximate position in which they are to be welded and to guide the members in a relative separation and return movement, the provision of improved electrical apparatus and circuitry to cause the relative separation and a controlled arc weld action, comprising a single welding current source having first and second terminals, a pilot arc circuit including said workpieces connectable across said terminals and having means therein limiting the current flow to a value below that required for arc welding, means to cause a separation of the workpieces and open an air gap in said pilot arc circuit to draw a pilot arc between the workpieces, said pilot arc circuit thereby having a first condition of low voltage drop between the workpieces and a second condition of high voltage drop between the workpieces, a weld current circuit including said workpieces connectable across said terminals to deliver full arc welding power to the gap drawn between the workpieces, control circuit means connected in parallel to the pilot arc circuit in such electrical position that the voltage across the terminals of the control circuit is established by the voltage drop between the workpieces, and weld circuit control means in said control circuit having a first condition at low voltage and a second condition at high voltage, said control means in said second condition closing the said weld circuit and in said first condition opening the said weld circuit.

2. In a drawn arc welding apparatus having mechanical provisions for placing two members into contact in the approximate position in which they are to be welded and to guide the members in a relative separation and return movement, the provision of improved electrical apparatus and circuitry to cause the relative separation and a controlled arc weld action, comprising, a single welding current source having first and second terminals, a pilot arc circuit including said workpieces connectable across said terminals and having means therein limiting the current flow to a value below that required for arc welding, means to cause a separation of the workpieces and open an air gap in said pilot arc circuit to draw a pilot arc between the workpieces, said pilot arc circuit thereby having a first condition of low voltage drop between the workpieces and a second condition of high voltage drop between the workpieces, a weld current circuit including said workpieces connectable across said terminals to deliver full arc welding power to the gap drawn between the workpieces, control circuit means connected with one terminal associated with one workpiece and one terminal associated with the other workpiece to thereby have a voltage potential corresponding to the voltage drop between the workpieces, and weld circuit control means in said control circuit having a first condition at low voltage and a second condition at high voltage, said control means in said second condition closing the said weld circuit and in said first condition opening said weld circuit.

3. In a drawn arc welding apparatus having mechanical provisions for placing two members into contact in the approximate position in which they are to be welded, and to guide the members in a relative separation and return movement, the provision of improved electrical apparatus and circuitry to cause the relative separation and a controlled arc welding action, comprising, means to drive said workpieces to a contact position, an electrical prime mover, means responsive to said prime mover when energized to cause said relative separation of the workpieces, a single welding current source having first and second terminals, first circuit means including said electrical prime mover connectable across said terminals for energizing said prime mover and causing the workpieces to separate and draw an arc therebetween, a pilot arc circuit from one said terminal to one workpiece which is completed to the other terminal through the workpieces, switch means in said pilot arc circuit, a weld current circuit from said one terminal to said one workpiece which is completeable to the other terminal through the workpieces, a normally open switch in said weld current circuit, and a control circuit from said pilot arc circuit through an electrical switch closing device to the other terminal, said switch closing device requiring a determined minimum line voltage to operate, said control circuit thereby being a shunted parallel circuit to said pilot arc circuit when the pilot arc circuit is closed and thereby being ineffective to operate said switch device until separation of the workpieces establishes a greater voltage drop, said switch closing device connected to close said normally open switch whereby said control circuit will be operative only upon separation of the workpieces to establish a voltage drop, whereafter the weld current circuit will be closed to deliver a weld current to the separated workpieces.

4. In a drawn arc welding apparatus having mechanical provisions for placing two members into contact in the approximate position in which they are to be welded and to guide the members in a relative separation and return movement, the provision of improved electrical apparatus and circuitry to cause the relative separation and a controlled arc welding action, comprising, means to drive said workpieces to a contact position, an electrical prime mover, means responsive to said prime mover when energized to cause said relative separation of the workpieces, a single welding current source having first and second terminals, first circuit means including said electrical prime mover and said workpieces connectable across said terminals for energizing said prime mover and causing the workpieces to separate and draw an arc therebetween, a weld current circuit to said workpieces with a normally open switch therein, a control circuit bridging said workpieces and deriving operating voltage from the voltage across the separated workpieces, said control circuit including electrically responsive means to close said normally open switch in the weld circuit, said weld circuit in closed condition shunting and rendering said prime mover ineffective, a holding circuit in parallel connection to said first circuit including means to hold said workpieces separated after movement by said prime mover, shunting of said prime mover by closing of said weld circuit rendering said holding circuit operative, timer means initiated with said control circuit, means operated by said timer after a determined interval to shunt the said means holding said workpieces in the holding circuit and thereby permitting the workpieces to return to contact with the welding circuit remaining operative, and means in said control circuit responsive to timing-out of said timer to open said weld circuit after the workpieces have returned to contact.

References Cited in the file of this patent

UNITED STATES PATENTS

| | | |
|---|---|---|
| 2,256,480 | Hughes | Sept. 23, 1941 |
| 2,648,748 | Sayer | Aug. 11, 1953 |
| 2,847,557 | English | Aug. 12, 1958 |